United States Patent
McCarthy et al.

[11] Patent Number: 6,006,968
[45] Date of Patent: Dec. 28, 1999

[54] GAME TOWING ASSEMBLY

[76] Inventors: Don McCarthy; David Warren, both of 4634 N. Brighton, Kansas City, Mo. 64117

[21] Appl. No.: 09/115,468

[22] Filed: Jul. 15, 1998

[51] Int. Cl.[6] ............................................. A45F 3/14
[52] U.S. Cl. ............................ 224/184; 224/921; 224/259
[58] Field of Search .................... 119/857, 856, 119/725; 280/1.5; 224/184, 103, 921, 250, 633, 261, 262, 153, 259

[56] References Cited

U.S. PATENT DOCUMENTS

| | | | |
|---|---|---|---|
| 707,610 | 8/1902 | Moeller . | |
| 2,931,629 | 4/1960 | Keller | 224/184 |
| 2,996,228 | 8/1961 | Bauman | 224/184 |
| 3,038,644 | 6/1962 | Johnson | 224/184 |
| 3,074,074 | 1/1963 | Lovering | 224/184 |
| 3,077,292 | 2/1963 | Gehrke | 224/184 |
| 3,486,671 | 12/1969 | Sanders | 224/6 |
| 3,547,456 | 12/1970 | Sapp | 280/19 |
| 3,771,808 | 11/1973 | Duerst | 280/19 |
| 3,912,290 | 10/1975 | Rich | 280/9 |
| 4,046,393 | 9/1977 | Vadnais | 280/19 |
| 4,132,427 | 1/1979 | McGee | 280/19 |
| 4,431,121 | 2/1984 | Bensette | 224/184 |
| 4,567,853 | 2/1986 | Hayden | 119/102 |
| 4,667,624 | 5/1987 | Smith | 19/96 |
| 4,706,858 | 11/1987 | Whatley | 224/184 |
| 5,064,108 | 11/1991 | Headley | 224/253 |
| 5,540,364 | 7/1996 | Krieger et al. | 224/153 |
| 5,579,966 | 12/1996 | Krumweide et al. | 224/637 |

FOREIGN PATENT DOCUMENTS

| | | | |
|---|---|---|---|
| 448635 | 5/1948 | Canada | 224/210 |
| 1059161 | 6/1959 | Germany | 224/210 |

*Primary Examiner*—Michael J. Carone
*Assistant Examiner*—Judith A. Nelson
*Attorney, Agent, or Firm*—Joseph N. Breaux

[57] ABSTRACT

A game towing assembly comprises a flexible adjustable collar adapted to fit snugly about a neck of a slain game animal. A manual towing structure is secured to the collar for pulling the collar along with the slain game animal, so that the slain game animal can travel along the ground.

16 Claims, 2 Drawing Sheets

GAME TOWING ASSEMBLY

TECHNICAL FIELD

The present invention relates generally to towing devices and more particularly to a game towing assembly. The game towing assembly is an apparatus that consists of a backpack with a rigid frame that is removably attached to a harness, being a pair of looped towing straps, which allows one or more persons, such as hunters, to easily drag a slain game animal. The game towing assembly functions as a combination backpack and a towing apparatus, allowing the person to add the game towing assembly to personal equipment without being weighted down. The game towing assembly utilizes VELCRO fittings for securement, and quick-release buckles for use.

BACKGROUND ART

Numerous towing devices have been provided in prior art. For example, U.S. Pat. Nos. 3,547,446 to Sapp; 3,771,808 to Duerst; 3,912,290 to Rich; 4,046,393 to Vadnals; 4,132,427 to McGeen and 4,567,853 to Hayden all are illustrative of such prior art. While these units may be suitable for the particular purpose to which they address, they would not be as suitable for the purposes of the present invention as heretofore descried.

The Sapp U.S. Pat. No. 3,547,456 teaches a game-transporting device including a flexible enclosure adapted to hold an animal to be transported. The enclosure has a closable elongated opening for inserting the animal to be transported therein. The enclosure consists of a durable material having a smooth outer surface and manual towing means secured to the enclosure means for dragging the enclosure means containing the animal, along the ground.

The Duerst U.S. Pat. No. 3,771,808 teaches a portable skid for hauling game from the field which comprises a rectangular sheet of plastic having a high tear strength and provided with reinforced apertures along the side margins and forward margin. When not in use, the skid is rolled in a coil and carried on the shoulder by a sling. When in use, the game carcass is placed on the unrolled skid and cords tied between the reinforced apertures on the side margins to form a upwardly open U-shaped channel around the carcass with the narrow bottom web interconnecting the channel side walls functioning as a runner. A rope secured to reinforced apertures in the forward margin is used to drag the skid. In one embodiment of the invention, spaced bands having a stiff pile or fiber surface on the upper surface of a plastic sheet prevent the carcass from sliding off the skid.

The Rich U.S. Pat. No. 3,912,290 teaches that a collapsible sled of the instant invention has been designed with the hunter in mind. It is compact and easy to carry and folds to a size which may be easily carried on a hunter's back. The weight of the sled is minimal inasmuch as its construction is primarily of lightweight metal, such as aluminum, and the cross bars or braces extending between the opposite side runner sections of each sled section are upwardly concave, whereby a killed animal may be at least partially cradled in the sled when the latter is in use.

The Vadnais U.S. Pat. No. 4,046,393 teaches a portable plastic sled for the rescue of injured persons and disabled snowmobiles. The sled is constructed of heave gauge low density polyethylene having a molecular memory and formed to lay substantially flat when unrolled with the exception of the front portion which retains a partial curvature. A transverse bar at the front of the sled includes a socket for attachment of a separate crank, to enable the sled to be conveniently rolled into a tight bundle for stowage aboard a snowmobile or all terrain vehicle. The crank is formed with attachments to permit use as handle for manual towing or as a tow bar for snowmobile towing. The crank also becomes a convenient carrying handle when the sled is rolled up. An integral tail on the sled retains the sled in the rolled up condition and multipurpose clamp lines retain the crank handle to the rolled up sled.

The McGee U.S. Pat. No. 4,132,427 teaches a frame sled that has straps affixed to members thereof for releasably securing an animal carcass to the sled. Pulling straps affixed to the sled at the front thereof facilitate pulling of the sled.

The Hayden U.S. Pat. No. 4,567,853 teaches an animal carrier apparatus including a base portion, an animal support portion, a locking portion and a towing portion. The base portion includes a pair of frame members. Each frame member has a generally quadrangular configuration with upper and lower horizontal sections and end section joining same. The frame members being pivotally connected to one another. The pivotal connection being along the end sections of the frame members. The pivotal connection being at the same respective location on each end section. The pivotal connection enabling the frame members to be pivoted substantially parallel to each other for compact storage. The animal support portion includes spaced transverse strips extending between the upper sections of the frame members and spaced longitudinal strips crossing with the transverse strips. Restraining mechanism is operatively connected to the crossed strips. The locking portion includes a mechanism for maintaining the frame members in a spread configuration with the transverse strips in an extended condition. The towing portion includes a connector extending from forward ends of the frame members, whereby an animal's legs can be inserted through spaces between the crossed strips with its body held by the restraining mechanism and the locking portion maintaining the frame members spread so the connector can be utilized to tow the animal.

GENERAL SUMMARY DISCUSSION OF INVENTION

The game towing assembly consists of a backpack featuring a series of VELCRO fittings along its rear surface. The VELCRO fittings would serve to mount the backpack onto a rigid frame with a padded side. Extending from the rigid frame is a pair of padded shoulder straps fitted at the centers with quick-release buckles. Extending from each top corner of the rigid frame is a "male" end of a quick-release buckle, identical in style to the quick-release buckles used with the padded shoulder straps, while each bottom corner would feature a "female" end of a quick-release buckle. Each of the male ends and female ends on the rigid frame would fit into opposite female ends and male ends attached to two looped towing straps. The looped towing straps would be gathered and mounted to the exterior of a collar by rotating "D" rings.

A primary object of the present invention is to provide a game towing assembly that will overcome the shortcomings of the prior art devices.

Another object is to provide a game towing assembly that includes a rigid fame having a pair of padded shoulder straps securable over the shoulders of a user, a pair of looped towing straps secured between the rigid fame and a collar that is positionable about the neck of a slain game animal, and a backpack having a number of VELCRO fittings attachable to the rigid frame to secure the backpack in a removable manner to the rigid frame.

An additional object is to provide a game towing assembly that is lightweight and can be used by a hunter or hunters for towing slain game animals out to a road or camp from a hunting site.

A further object is to provide a game towing assembly that is simple and easy to use.

A still further object is to provide a game towing assembly that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

Similar reference characters denote corresponding features consistently throughout the attached drawings.

EXEMPLARY MODE FOR CARRYING OUT THE INVENTION

Figure 2:
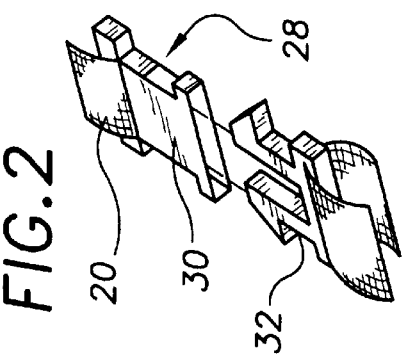
FIG. 2 is an enlarged perspective view of one of the quick-release buckles as indicated generally by arrow 2 in FIG. 1.
Figure 1:
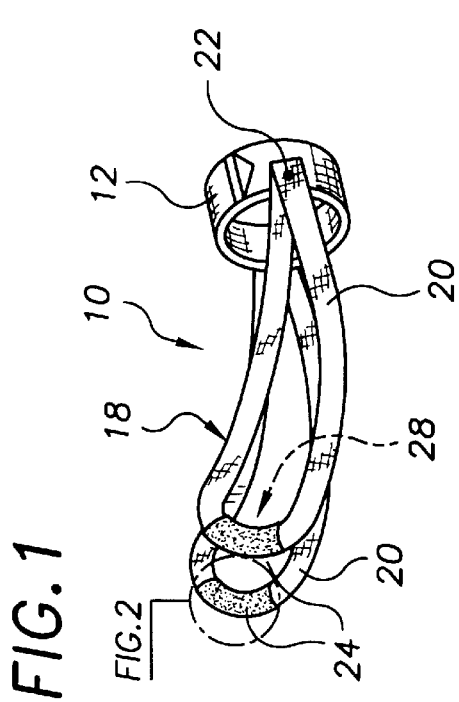
FIG. 1 is a perspective view of the present invention.
Figure 3:
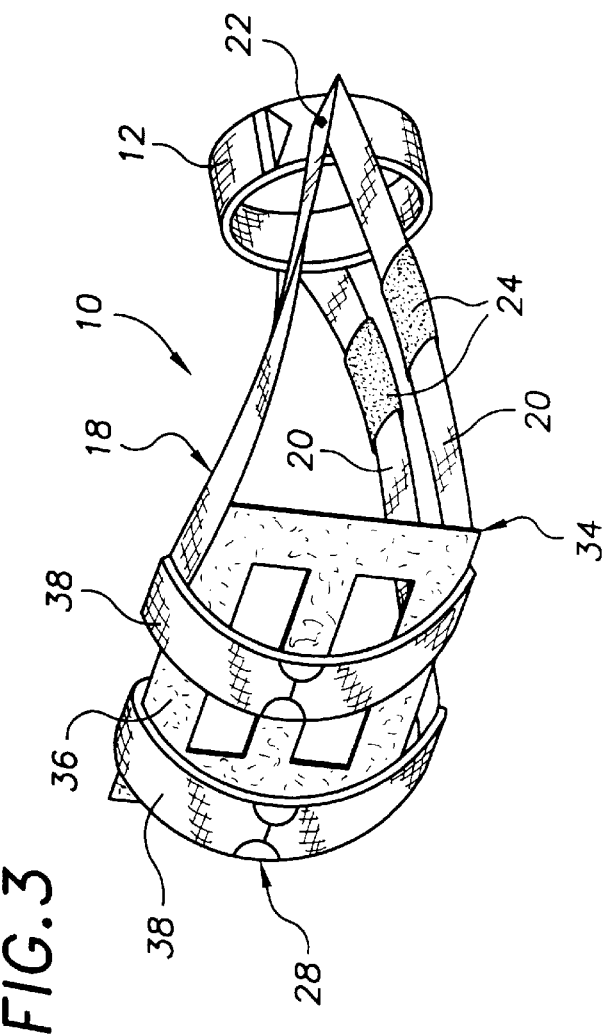
FIG. 3 is a perspective view of the present invention similar to FIG. 1, showing a rigid frame with padded shoulder straps removably attached thereto.
Figure 4:
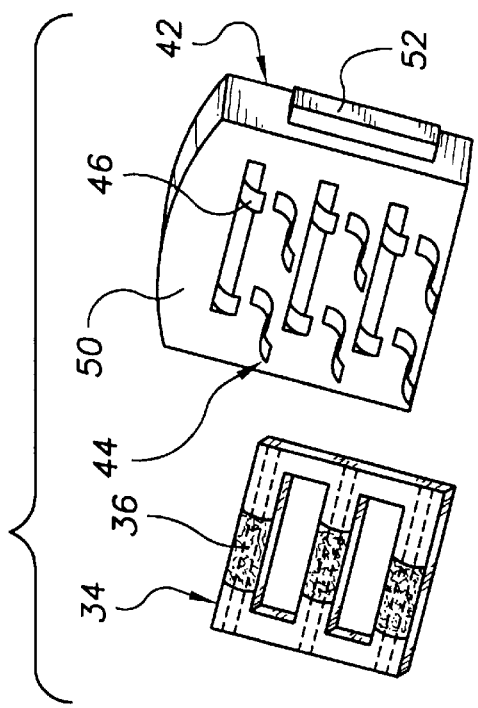
FIG. 4 is an exploded perspective view, showing a backpack ready to be attached to the rigid frame.
Figure 5:
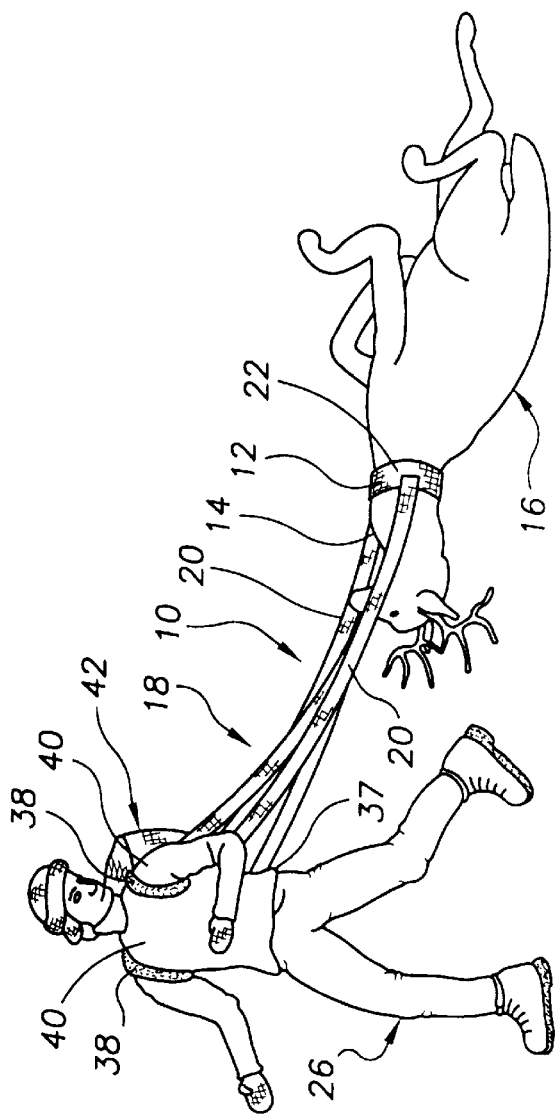
FIG. 5 is a perspective view, showing a person utilizing the present invention as a towing device with the backpack in place.

Turning now descriptively to the drawings, in which similar reference characters denote similar elements throughout the several views, FIGS. 1 through 5 illustrate the various features of the present invention being a game towing assembly 10, comprising a flexible adjustable collar 12 adapted to fit snugly about a neck 14 of a slain game animal 16. A manual towing structure 18 is secured to collar 12 for pulling collar 12 along with the slain game animal 16, so that slain game animal 16 can travel along the ground.

The manual towing structure 18 includes a pair of looped towing straps 20. Each looped towing strap 20 is mounted at rearward ends to an exterior surface of collar 12 by a rotating D-ring 22. A pair of hand grip sleeves 24 can be provided. Each hand grip sleeve 24 slides on one looped towing strap 20, enabling hand grip sleeves 24 to be positioned on forward portions of looped towing straps 20 opposite from collar 12. In a first instance, one person 26 can grasp the hand grip sleeves to pull collar 12. In a second instance, two persons 26 together can each grasp one hand grip sleeve 24 to pull collar 12. Each looped towing strap 20 contains a quick-release buckle 28, having a female end 30 and a mating male end 32 located at the forward portion which can be covered by hand grip sleeve 24.

A rigid frame 34 has a padded side 36 which faces a back 37 of person 26. A pair of padded shoulder straps 38 extend from rigid frame 34, to fit over the shoulders 40 of person 26. A male end 32 of a quick-release buckle 28 extends from each top corner of rigid frame 34, to mate with female end 30 of quick-release buckle 28 on one looped towing strap 20. A female end 30 of a quick-release buckle 28 extends from each bottom corner of rigid frame 34, to mate with male end 32 of quick-release buckle 28 on one looped towing strap 20. The looped towing straps 20 can now function as a harness, which allows the person 26 to drag the slain game animal 16 along the ground. Each shoulder strap 38 includes a quick-release buckle 28 having a female end 30 and a mating male end 32 located at the center, to allow the person 26 to easily remove shoulder straps 38 from shoulders 40.

The game towing assembly 10 further comprises a backpack 42 and components 44 for securing backpack 42 in a removable manner to rigid frame 34. Backpack securing components 44 consists of a plurality of VELCRO fittings 46 on a rear surface 50 of backpack 42, to hold backpack 42 onto rigid frame 34. Backpack 42 can include a storage sleeve 52, for holding collar 12 and the pair of looped towing straps 20 therein when not in use.

Collar 12 is fabricated of a leather material, each looped towing strap 20 is fabricated out of nylon, each handgrip sleeve 24 is fabricated out of nylon, while each quick-release buckle 28 is fabricated out of plastic. Rigid frame 34 is fabricated out of aluminum, each padded shoulder strap 38 includes foam rubber and backpack 42 is fabricated out of canvas. Other types of materials when suited, can be substituted for materials listed above for the various elements.

It can be seen from the preceding description that in use, a person 26 would wear the rigid frame 34 and backpack 42 in place of a standard backpack. When not in use, the person 26 would store the collar 12 and looped towing straps 20 inside the backpack 42. To carry a slain game animal 16, the person 26 would remove the collar 12 and looped towing straps 20 from the backpack 42, then open the collar 12 and wrap it around the neck 14 of the slain game animal 16. Once secured, the person 26 would walk towards a campsite, vehicle, etc. while dragging the slain game animal 16 behind him. Should the person 26 wish to utilize the rigid frame 34 without the backpack 42, he may open the VELCRO fittings 46 and replace the rigid frame 34 and shoulder straps 38 on his body. Should the person 26 wish to utilize the collar 12 and looped towing straps 20 by themselves, he may disengage the looped towing straps 20 from their quick-release buckles 28, then link the male ends 32 and female ends 30 together. He may then pull the connected looped towing straps 20 with one or both hands, slide them over his shoulders 40 or pull one looped towing strap 20 together with another person pulling the opposite looped towing strap 20. Use of the game towing assembly 10 would provide all persons 26, such as hunters, with a convenient easy way to drag their slain game animal 16.

It is noted that the embodiment of the game towing assembly described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A game towing assembly comprising:

a) a flexible adjustable collar adapted to fit snugly about the neck of a slain game animal; and b) a manual towing means secured to the collar for pulling the collar along with the slain game animal, so that the slain game animal can travel along the ground;

c) said manual towing means includes a pair of looped towing straps, in which each looped towing strap is mounted at rearward ends to an exterior surface and opposing side of the collar, by a rotating D-ring.

2. The game towing assembly as recited in claim 1, wherein said manual towing means includes a pair of hand grip sleeves, in which each said hand grip sleeve slides on one said looped towing strap, enabling said hand grip sleeves to be positioned on forward portions of said looped towing straps opposite from said collar, so that in a first instance one person can grasp said hand grip sleeves to pull said collar, and in a second instance two persons together can each grasp one said hand grip sleeve to pull said collar.

3. The game towing assembly as recited in claim 2, in which each said looped towing strap includes a quick-release buckle having a female end and a mating male end located at said forward portion which can be covered by said hand grip sleeve.

4. The game towing assembly as recited in claim 3, wherein said manual towing means includes:

a) a rigid frame having a padded side which faces a back of a person;

b) a pair of padded shoulder straps extending from said rigid frame to fit over the shoulders of the person;

c) a male end of a quick-release buckle extending from a top corner of said rigid frame to mate with said female end of said quick-release buckle on one said looped towing strap; and d) a female end of a quick-release buckle extending from a bottom corner of said rigid frame to mate with said male end of said quick-release buckle on one said looped towing strap, so that said looped towing straps can now function as a harness, which allows the person to drag the slain game animal along the ground.

5. The game towing assembly as recited in claim 4, wherein each said shoulder strap includes a quick-release buckle having a female end and a mating male end located at the center, to allow the person to easily remove said shoulder straps from the shoulders.

6. The game towing assembly as recited in claim 4, further including:

a) a backpack; and b) means for securing said backpack in a removable manner to said rigid frame.

7. The game towing assembly as recited in claim 6, wherein said backpack securing means includes a plurality of VELCRO fittings on a rear surface of said backpack, to hold said backpack onto said rigid frame.

8. The game towing assembly as recited in claim 6, wherein said backpack includes a storage sleeve for holding said collar and said pair of looped towing straps therein when not in use.

9. The game towing assembly as recited in claim 1, wherein said collar is fabricated out of a leather material.

10. The game towing assembly as recited in claim 1, wherein each said looped towing strap is fabricated out of nylon.

11. The game towing assembly as recited in claim 2, wherein each said handgrip sleeve is fabricated out of nylon.

12. The game towing assembly as recited in claim 3, wherein each said quick-release buckle is fabricated out of plastic.

13. The game towing assembly as recited in claim 4, wherein said rigid frame is fabricated out of aluminum.

14. The game towing assembly as recited in claim 4, wherein each said padded shoulder strap includes foam rubber.

15. The game towing assembly as recited in claim 5, wherein each said quick-release buckle is fabricated out of plastic.

16. The game towing assembly as recited in claim 6, wherein said backpack is fabricated out of canvas.

* * * * *